Nov. 16, 1948.   W. H. HARSTICK   2,453,791
FLUID CLUTCH, GOVERNOR CONTROLLED
Filed Dec. 31, 1943   2 Sheets-Sheet 1

Inventor:
William H. Harstick.
By Paul O. Pippel
Atty.

Nov. 16, 1948.  W. H. HARSTICK  2,453,791
FLUID CLUTCH, GOVERNOR CONTROLLED
Filed Dec. 31, 1943  2 Sheets-Sheet 2
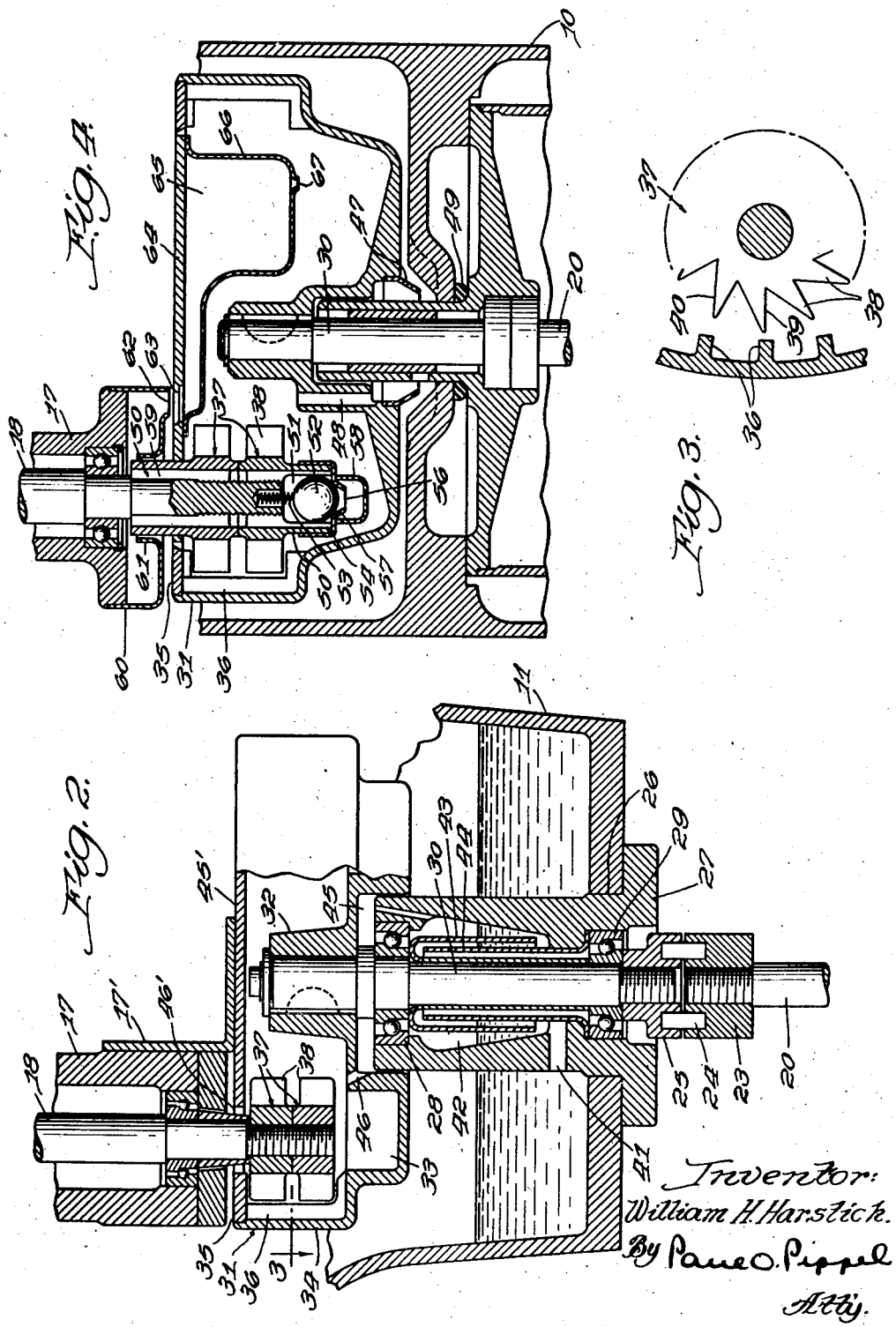

Patented Nov. 16, 1948

2,453,791

UNITED STATES PATENT OFFICE 2,453,791

FLUID CLUTCH, GOVERNOR CONTROLLED

William H. Harstick, Richmond, Ind., assignor to International Harvester Company, a corporation of New Jersey Application December 31, 1943, Serial No. 516,568

11 Claims. (Cl. 192—58)

This invention relates to a centrifugal device. More specifically, it relates to a fluid drive mechanism particularly adaptable for cream separators or the like.

In the application of electric motors as a source of power for devices such as centrifugal separators where it is required to build up a large inertia of the rotating parts, before operating speed is attained, difficulty has been encountered due to the low torque output of conventional motors at speeds substantially below their normal operating speed. Also, in driving devices such as cream separators where speeds are required far beyond conventional or even high-speed electric motors, the gearing for operating at such high speeds is expensive to manufacture and difficult to maintain in quiet operating condition.

A principal object of the present invention is to provide a fluid drive for a high-speed centrifugal device, such as a cream separator.

Another important object is to provide a fluid coupling device for an electric motor-driven centrifugal device incorporating means for obtaining a substantial increase in speed ratio between the motor-operated driving element and the driven element.

Another object is to provide means for continuously delivering fluid to the fluid coupling device and for removing excess liquid therefrom, so as to maintain constant volume of liquid in the operating portion of the fluid drive.

Another object is to provide a governor device effective to maintain the speed of the driven element within predetermined limits.

These objects and others, which will be apparent from the following description, are attained by constructions, two of which are shown embodied in a cream separator drive.

In the drawings:

Figure 2 is a section of the driving and driven shafts of the fluid drive power transmission mechanism of Figure 1;

Figure 3 is a section taken on the line 3—3 of Figure 2, showing the adjacent portions of the fluid drive elements; and Figure 4 is a section similar to Figure 2, showing a modification with a governor device incorporated.

Figure 1:
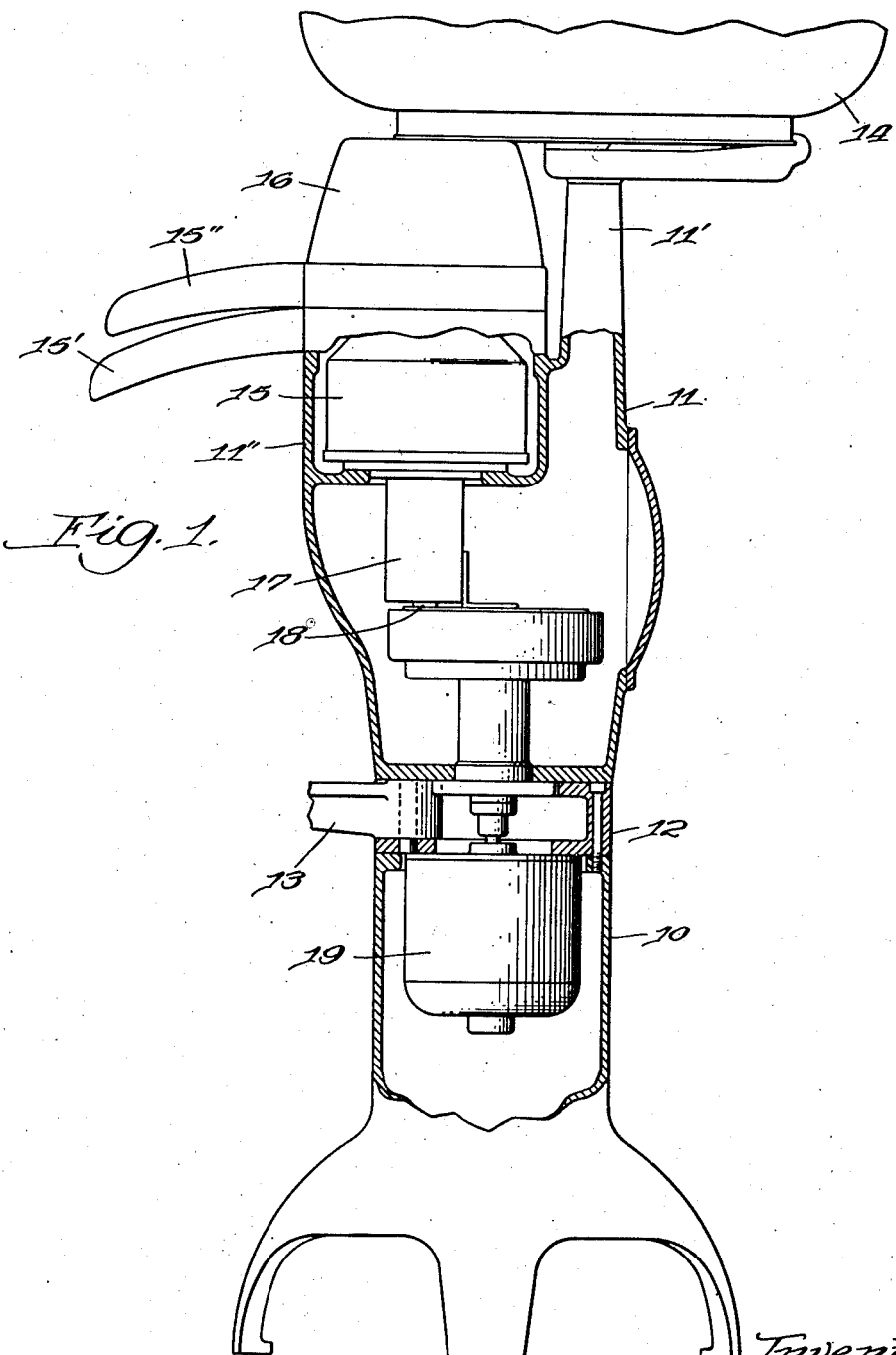
Figure 1 is an elevation of a conventional type of cream separator with the body portion broken away in section to show an installation of the fluid drive device of the invention.

Figure 1 shows in outline a conventional type of cream separator having a base 10 and a body portion or housing 11 spaced from the base 10 by an intermediate section 12. The intermediate section 12 carries a support 13 for fluid receptacles. A supply can 14 is carried by an upstanding bracket 11' on the housing 11. Said housing is also formed with an open top cylindrical portion 11", in which a conventional supporting bowl 15 is mounted. A skimmed milk spout 15', a cream spout 15", and a cover 16 are shown above the bowl 15.

A supporting structure 17 for the bowl and a spindle 18 for driving the bowl is also illustrated in Figure 1. It will be understood that all these elements are conventional, and that in so far as the present invention is concerned, reference will be made only to the spindle 18, which is directly connected to the bowl for driving it at the high speed required for the separation of milk.

A vertically positioned motor 19 is mounted in the base 10 being secured to and carried by the intermediate section 12. An upwardly extending drive shaft 20, projecting from the motor, as shown in Figures 1 and 2, is provided with a coupling member 23 which is secured by rawhide leather pins 24 to a second coupling member 25. Said leather pins are fitted in alined openings formed in the coupling members 23 and 25 providing a resilient drive, which does not transmit vibration or noise to or from the motor shaft.

The housing 11 is formed with an opening 26 centrally in the bottom thereof into which a flanged supporting member 27 is fitted from the lower end. Said member may be removably or permanently secured to the housing in liquid-tight relation with respect thereto. The supporting member 27 carries a ball-bearing assembly 28 at its upper end and a ball-bearing assembly 29 at its lower end. A driving shaft 30 supported by said bearings receives power from the motor shaft 20 by means of the coupling member 25 which is secured to the lower end of the shaft 30.

A fluid coupling impeller member 31 is keyed on the upper end of the shaft 30. Said member has a hub portion 32, an annular reservoir portion 33 formed as an annulus in a horizontal plane, and a cylindrical and a peripheral portion 34 extending outwardly beyond the reservoir portion 33. Said peripheral portion is channel shaped in cross-section to provide a liquid receptacle during rotation. The upper portion of this channel-shaped section is formed by an annular ring 35 fitted into the top of the fluid coupling member which is otherwise formed in one piece. The radial depth of the annulus 35 is significant as it determines the depth of the fluid in the channel-shaped section of the fluid coupling member during rotation.

A plurality of inwardly extending ribs or vanes 36 projecting from the bottom of the channel-shaped section of the fluid coupling member 31, provides means effective to drive the liquid around with the fluid coupling during rotation.

The spindle 18, which is the driven shaft of this device, carries a pair of fluid driven elements 37 which have a plurality of vanes 38 formed therearound. The vanes may take the particular shape shown in Figure 3, in which one edge 39 is formed substantially on a radius, the other edge 40 sloping away from the radius. As shown in both Figures 2 and 3, the ribs or vanes 36 on the fluid coupling member 31 terminate in slightly spaced relation with respect to the vanes 39 on the fluid drive elements 37.

As indicated in Figure 2, the bottom of the housing 11 serves as a liquid reservoir. A bore 41 in the wall of the supporting member 27 serves as a conduit to deliver liquid into a chamber 42 formed in the supporting member 27 between the bearings 28 and 29. A liquid seal is formed around the shaft 30 to prevent the escape of oil therefrom. Said seal consists of two baffle members, one of which, 43, is carried by the shaft 30 extending along said shaft in contact therewith to the upper bearing 28 and then downwardly in spaced relation with respect to the shaft. The other baffle member 44 is secured in liquid-tight relation between the bearing 29 and the supporting member and extends upwardly between and out of contact with the two spaced portions of the baffle member 43. It will be understood that liquid will remain at the same level within the chamber 42 as in the housing 11 when the device is not in operation.

The baffle structure and the chamber 42 are shaped to cause a continuous upward movement of oil during rotation of the driving shaft upwardly through the bearing 28.

The upper end of the supporting member 27 fits into an annular compartment 45 formed between the reservoir portion 33 of the fluid coupling member 31 and the shaft 30. Liquid flowing into this compartment from the bearing 28 is delivered through an opening 46 into the interior of the fluid coupling member, thereby continually replenishing the liquid in said member. A cover plate 45' fitted within the center of the annular member 35 is cut out at 46' to permit passage of the spindle 18. Said cover is secured in position by a bracket 17' fixed thereto and to the spindle supporting structure 17.

In the operation of the power transmission and coupling device shown in Figure 2, the motor is first put into operation, whereby the speed of the coupling member 31 is rapidly increased. Liquid in the reservoir 33 will be thrown out by the centrifugal action into the channel-shaped portion 35 of the coupling member forming an annular layer around the interior of said member of a depth determined by the radial depth of the annular member 35. As the fluid coupling member 31 rotates, the layer of liquid carried internally thereby will engage the vanes 38 on the fluid coupling elements 37, exerting drive torque against said elements. As there is a great deal of inertia to overcome and momentum to develop in bringing the separator bowl up to speed during the initial stage of operation, there will be a greater percentage of slippage between the vanes 36 and the vanes 38. The driving torque available will be the shearing action on the liquid between the portion of the liquid carried by the vanes 38 and the portion engaged by the vanes 36. In this respect, this fluid coupling construction is similar to the fluid couplings now used extensively in the automotive vehicle field. As the effective radius of the vanes 36 with respect to their center of rotation and of the vanes 38 is greatly different, there will be a step up in speed of the driven element. This speed ratio will be approximately the ratio of the radius of the tips of the vanes on the respective members. This construction may be roughly compared to an internal gear drive in which the teeth are separated until they clear each other. The driving effort is then due to the inertia of the liquid and the shear of the liquid entrained between the adjacent rotating surfaces. The construction could also be compared to an internal type of friction drive with the surfaces supported so that the coefficient of friction accomplishing the drive would be determined by the shear of the liquid between the surfaces rather than by the coefficient of friction by the engaging parts of the friction drive.

As the inertia of the cream separator bowl and the associated parts is overcome, the drive will approach the speed ratio determined by the effective radii of the driving and driven elements. After operating speed has been attained, the power input of a device such as a cream separator is not great, and the power to be transmitted through the fluid coupling will be relatively small, whereby the shearing action of the liquid will maintain the drive with only a predeterminable percentage of slippage. The thickness of the liquid annulus in the coupling member 31 is maintained by the constant addition of liquid with the excess escaping past the annular member 35 which acts as a regulating means.

In Figure 4 a construction somewhat similar to that shown in Figure 2 is illustrated. The same reference characters designate the supporting structure 17, the spindle 18, the driven coupling elements 37 and the vanes 38 thereon, the fluid coupling member 31, the annular cover member 35, and the vanes or ribs 36. The housing 10 and the motor shaft 20 also bear the same reference characters.

In the construction shown in Figure 4, a liquid circulating means is provided by a conical member 47 carried by the fluid coupling member 31 spaced from the shaft 20. Said member delivers liquid upwardly through a channel 48 formed in the hub 32 which also acts as a depth regulator for liquid during standing of the structure when it is not operating. Suitable sealing means including a sealing ring 49 are provided for preventing the escape of liquid from the housing 10.

The lower end of the spindle shaft 18, in the construction of Figure 4, carries a specially constructed upwardly extending sleeve 50 which is integral with the upper fluid element 37. A similar sleeve 50, integral with the lower fluid coupling element 37, extends downwardly below the end of the shaft 18, providing a valve chamber 51. A ball valve 52 is mounted in said chamber, being resiliently urged downwardly by a light spring 53. A cup 54, fitted over the lower sleeve 50, is provided with a central opening 56 and a conical portion 57 around said opening against the upper edge of which the ball 52 seats. The conical portion of the cup 54 is immersed in oil and as the cup rotates, upon rotation of the spindle 18, the centrifugal force of the oil upon the inner sloping surface of the conical portion causes the oil to be forced upwardly in a continuous pumping manner. The inner sloping surface of the conical portion and the centrifugal action of oil upon said surface thus provides in effect a continuous pumping device exerting sufficient pressure upon a predetermined speed of rotation to unseat the ball valve 52 and to pump oil to the channels 59. An inverted cup 58 is fitted over the conical portion 57, being provided with openings for the inlet of fluid.

The sleeves 50 of the fluid coupling elements 37 are provided with channels 59 for the flow of fluid axially from the valve chamber 51 out over the upper portion of the upper sleeve. A receptacle 60 fitted to the bottom of the supporting structure 17 for the spindle is provided with an internal upturned flange 61 adjacent to and spaced from the upper portion of the upper sleeve 50. Liquid thrown from the channels 57 is received by said receptacle and delivered through an opening 62 in the bottom thereof, and through an opening 63 in a cover plate 64 to a reservoir 65, formed by a receptacle 66, secured to the cover plate. Said cover plate may be secured by any means to the casing 17, for example, by a bracket as shown in Figure 2. The reservoir 65 has a metered opening 67 in the bottom thereof, through which the liquid is delivered back to the fluid coupling member 31.

In the operation of the modification disclosed in Figure 4, a governor action is obtained by the ball valve mechanism and the associated parts. When the spindle 18 attains the desired speed, the spring tension 53 is so arranged that the ball 52 remains on its seat. When the spindle 18 exceeds the predetermined speed as controlled by the action on the spring 53, the pressure of fluid in the conical portion 57 of the cup 54 becomes sufficient due to centrifugal action to lift the ball from the seat and pump liquid upwardly into the valve chamber 51 and through the channels 59 into the receptacle 60. From said receptacle it is delivered into the reservoir 65 from which it escapes at a metered rate through the orifice 67. Liquid is then temporarily removed from the fluid coupling member 31, thereby reducing the thickness of liquid in the annular operating band of liquid, consequently reducing the drag on the vanes 38 of the driven element. The liquid is slowly returned to the fluid coupling member 31, which assures maintaining the operation of the separator spindle very close to its optimum operating speed as predetermined by the spring setting on the ball valve.

Only two modifications of the fluid coupling drive of the invention have been shown. The device illustrated in Figure 4 incorporates a governor to maintain the drive within the desired speed range. Such governor action may be necessary in some conditions due to the change in oil viscosity used in a fluid coupling with changes in temperature. Other variations, such as the variation in the load imposed on the driven devices may also require some type of governing device. Applicant contemplates as his invention all fluid drive devices and governing means therefor falling within the scope of the appended claims.

What is claimed is:

1. A power transmitting means comprising in combination with a power furnishing means, a vaned fluid coupling member, a second fluid coupling member mounted for rotation, said member having a channel adapted to contain a body of liquid, vanes in said channel, said first-named fluid coupling member projecting into said second fluid coupling member with the vanes thereof closely spaced with respect to the vanes in the channel, a centrifugal fluid pumping device carried by one of said fluid coupling members, an inlet to said device disposed in the fluid in said second fluid coupling member, said pumping device being formed to develop a pressure proportional to the speed of the first-named fluid coupling member, a fluid container, means for delivering fluid from the pumping device to said container, and means for continually delivering liquid from the container to the fluid coupling member.

2. A power transmitting means comprising in combination with a power furnishing means, a vaned fluid coupling member, a second fluid coupling member mounted for rotation on an axis eccentric with respect to the axis of said vaned fluid coupling member, said member having a channel adapted to contain a body of liquid, vanes in said channel, said first-named fluid coupling member projecting into said second fluid coupling member with the vanes thereof closely spaced with respect to the vanes in the channel, a centrifugal fluid pumping device carried by one of said fluid coupling members, an inlet to said device disposed in the fluid in said second fluid coupling member, said pumping device being formed to develop a pressure proportional to the speed of the first-named fluid coupling member, a fluid control element positioned to cut off the flow of fluid from said pump until sufficient pressure is developed to overcome the resilient force acting on said control element, a fluid container, means for delivering fluid from the pumping device to said container, and means for continually delivering liquid from the container to the fluid coupling member.

3. A power transmitting means comprising in combination with a power furnishing means, a vaned fluid driven element, a fluid coupling member mounted for rotation and operatively connected to the means for furnishing power, said member having a channel adapted to contain a body of liquid, vanes in said channel, said fluid driven element projecting into said fluid coupling member, a centrifugal fluid pumping device carried by said fluid driven element, an inlet to said device disposed in the fluid in said fluid coupling member, said pumping device being formed to deliver fluid proportional to the speed of the driven element, a fluid container, said driven element being provided with conduit means for delivering fluid from the pumping device to said container, said container having a calibrated opening in continual communication with said channel for continually delivering liquid to the fluid coupling member.

4. A power transmitting means comprising in combination with a power furnishing means, a vaned fluid driven element, a fluid coupling member mounted for rotation and operatively connected to the means for furnishing power, said member having a channel adapted to contain a body of liquid, vanes in said channel, said fluid driven element projecting into said fluid coupling member, a centrifugal fluid pumping device carried by said fluid driven element, an inlet to said device disposed in the fluid in said fluid coupling member, said pumping device being formed to develop a pressure proportional to the speed of the driven element, a fluid control element positioned to cut off the flow of fluid from said pumping device until the driven element develops a sufficient pressure to actuate and open said fluid control element, a fluid container, said driven element being provided with conduit means for delivering fluid from the pumping device to said container, said container having a calibrated opening for continually delivering liquid to the fluid coupling member.

5. A power transmitting means comprising in combination with a power furnishing means, a vaned fluid driven element, a fluid coupling member mounted for rotation on a vertical axis and operatively connected to the means for furnishing power, said member having a channel adapted to contain a body of liquid, vanes in said channel, said fluid driven element projecting into said fluid coupling member with the vanes thereof closely spaced with respect to the vanes in the channel, a centrifugal fluid pumping device carried by said fluid driven element, an inlet to said device disposed in the fluid in said fluid coupling member, said pumping device being formed to deliver fluid proportional to the speed of the drive element, a fluid container positioned above the channel of said fluid coupling member, said driven element being provided with conduit means for delivering fluid from the pumping device to said container, said container having a calibrated opening for continually delivering liquid by gravity to the fluid coupling member.

6. A power transmitting means comprising in combination with a power furnishing means, a vaned fluid driven element, a fluid coupling member mounted for rotation on a vertical axis and operatively connected to the means for furnishing power, said member having a channel adapted to contain a body of liquid, vanes in said channel, said fluid driven element projecting into said fluid coupling member with the vanes thereof closely spaced with respect to the vanes in the channel, a centrifugal fluid pumping device carried by said fluid driven element, an inlet to said device disposed in the fluid in said fluid coupling member, said pumping device being formed to develop a pressure proportional to the speed of the driven element, a fluid control element positioned to cut off the flow of fluid from said pumping device until the driven element develops a sufficient pressure to actuate and open said control element, a fluid container, said driven element being provided with conduit means for delivering fluid from the pumping device to said container, said container having a calibrated opening for continually delivering liquid to the fluid coupling member.

7. A power transmitting means comprising in combination with a power furnishing means, a vaned fluid driven element, a fluid coupling member mounted for rotation and operatively connected to said power furnishing means, said member having an internal annular channel adapted to contain a body of liquid, vanes in said channel, said fluid driven element projecting into said fluid coupling member with the vanes thereof closely spaced with respect to the vanes in the channel, a cone-shaped centrifugal fluid pumping device operatively connected to said fluid driven element, an inlet to said device disposed in the fluid in said fluid coupling member, said pumping device being formed to develop a pressure proportional to the speed of the driven element, conduit means for delivering fluid from the pumping device to a container, said container having an opening for delivering liquid to the fluid coupling member and being of a capacity to hold a substantial portion of the liquid normally contained in the fluid coupling member, said pumping device and said container acting to provide a governing means to remove liquid from the coupling member when the driven element attains a predetermined speed, said container delivering the liquid back to the fluid coupling member to maintain a substantial constant speed of the driven element.

8. A power transmitting means comprising in combination with a power furnishing means, a vaned fluid driven element, a fluid coupling member mounted for rotation and operatively connected to said power furnishing means, said member having an internal annular channel adapted to contain a body of liquid, vanes in said channel, said fluid driven element projecting into said fluid coupling member with the vanes thereof closely spaced with respect to the vanes in the channel, a cone-shaped centrifugal fluid pumping device operatively connected to said fluid driven element, an inlet to said device disposed in the fluid in said fluid coupling member, said pumping device being formed to develop a pressure proportional to the speed of the driven element, conduit means for delivering fluid from the pumping device to a container, said container having a calibrated opening for delivering liquid to the fluid coupling member and being of a capacity to hold a substantial portion of the liquid normally contained in the fluid coupling member, said pumping device and said container with the calibrated opening therein acting to provide a governing means to remove liquid from the coupling member when the driven element exceeds a predetermined speed, said container delivering the liquid back to the fluid coupling member at a rate sufficient to maintain a substantial constant speed of the driven element.

9. A power transmitting means comprising in combination with a power furnishing means, a vaned fluid driven element, a fluid coupling member mounted for rotation and operatively connected to said power furnishing means, said member having an internal annular channel adapted to contain a body of liquid, vanes in said channel, said fluid driven element projecting into said fluid coupling member with the vanes thereof closely spaced with respect to the vanes in the channel, a fluid pumping device operatively connected to said fluid driven element, an inlet to said device disposed in the fluid in said fluid coupling member, said pumping device being formed to develop a pressure proportional to the speed of the driven element, a resiliently mounted fluid control element positioned to cut off the flow of fluid from said pump until the driven element attains a speed sufficient to overcome the resilient force acting on said control element, conduit means for delivering fluid from the pumping device to a container, said container having a calibrated opening for delivering liquid to the fluid coupling member and being of a capacity to hold a substantial portion of the liquid normally contained in the fluid coupling member, said pumping device and said container with the calibrated opening therein acting to provide a governing means to remove liquid fiom the coupling member, said container delivering the liquid back to the fluid coupling member at a rate sufficient to maintain a substantial constant speed of the driven element.

10. A power transmitting means comprising in combination with a power furnishing means, a vaned fluid driven element, a fluid coupling member mounted for rotation on an axis eccentric with respect to the axis of said vaned fluid driven element, said member having an internal annular channel adapted to contain a body of liquid, vanes in said channel, said fluid driven element projecting into said fluid coupling member with the vanes thereof closely spaced with respect to the vanes in the channel, a fluid pumping device carried by said fluid driven element, an inlet to said device disposed in the fluid in said fluid coupling member, said pumping device being formed to develop a pressure proportional to the speed of the driven element, a resiliently mounted fluid control element positioned to cut off the flow of fluid from said pump until the driven element attains a speed sufficient to overcome the resilient force acting on said control element, a fluid container, said driven element being provided with conduit means for delivering fluid from the pumping device to said container, said container having a calibrated opening for delivering liquid to the fluid coupling member.

11. A power transmitting means comprising in combination with a power furnishing means, a vaned fluid drive element, a fluid coupling member mounted for rotation on an axis eccentric with respect to the axis of said vaned fluid driven element, said member having an internal annular channel adapted to contain a body of liquid, vanes in said channel, said fluid driven element projecting into said fluid coupling member with the vanes thereof closely spaced with respect to the vanes in the channel, a fluid pumping device carried by said fluid driven element, an inlet to said device disposed in the fluid in said fluid coupling member, said pumping device being formed to develop a pressure proportional to the speed of the driven element, a resiliently mounted fluid control element positioned to cut off the flow of fluid from said pump until the driven element attains a speed sufficient to overcome the resilient force acting on said control element, a fluid container, said drive element being provided with conduit means for delivering fluid from the pumping device to said container, said container having a calibrated opening for delivering liquid to the fluid coupling member and being of a capacity to hold a substantial portion of the liquid normally contained in the fluid coupling member, said pumping device and said container with the calibrated opening therein acting to provide a governing means to remove liquid from the coupling member, said container delivering the liquid back to the fluid coupling member at a rate sufficient to maintain a substantial constant speed of the driven element.

WILLIAM H. HARSTICK.

REFERENCES CITED

The following references are of record in the file of this patent:

UNITED STATES PATENTS

| Number | Name | Date |
| --- | --- | --- |
| 810,975 | Peterson | Jan. 30, 1906 |
| 1,760,775 | Peters | May 27, 1930 |
| 2,106,609 | Krauss | Jan. 25, 1938 |
| 2,182,049 | Henry | Dec. 5, 1939 |
| 2,195,561 | Dickerson | Apr. 2, 1940 |
| 2,299,049 | Ziebolz | Oct. 13, 1942 |

FOREIGN PATENTS

| Number | Country | Date |
| --- | --- | --- |
| 9,943 | Great Britain | 1902 |
| 443,892 | Great Britain | 1936 |